April 12, 1927.

P. W. LINDQUIST 1,624,173

FISH CLEANING APPARATUS

Filed Oct. 13, 1925     2 Sheets-Sheet 1

INVENTOR
Philip W. Lindquist
BY
John W. Maupin,
ATTORNEY

April 12, 1927.
P. W. LINDQUIST
1,624,173
FISH CLEANING APPARATUS
Filed Oct. 13, 1925   2 Sheets-Sheet 2
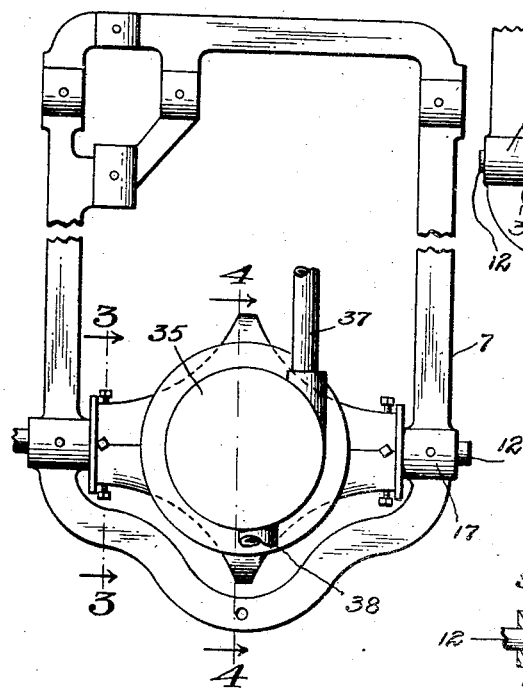
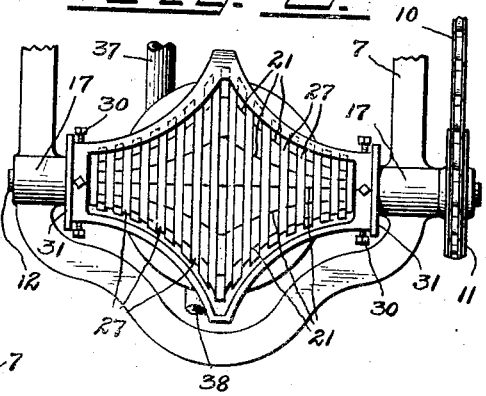
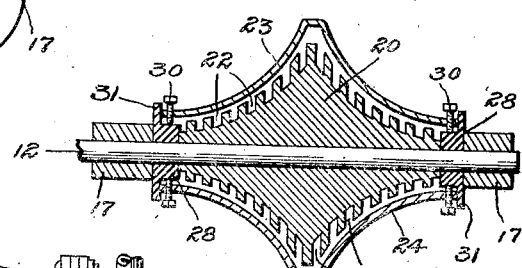
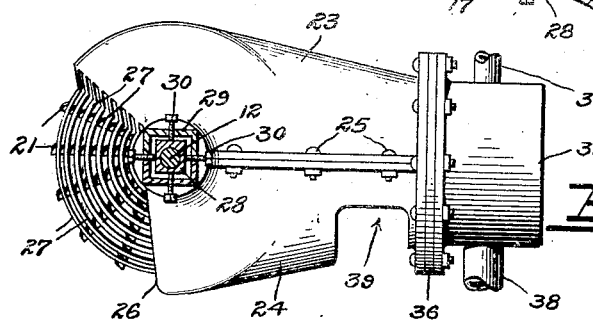
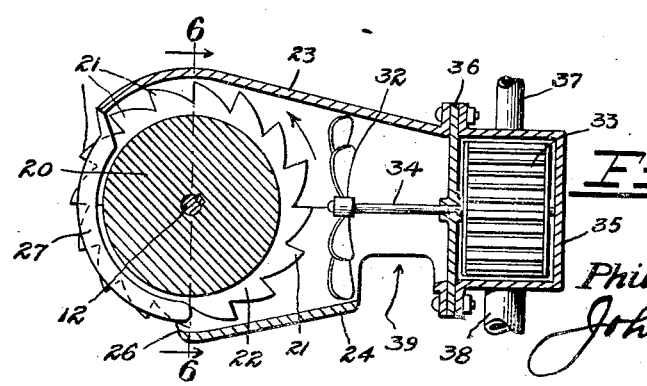
INVENTOR
Philip W. Lindquist
BY John W. Maupin.
ATTORNEY Patented Apr. 12, 1927.

1,624,173

UNITED STATES PATENT OFFICE.

PHILIP W. LINDQUIST, OF SEATTLE, WASHINGTON.

FISH-CLEANING APPARATUS.

Application filed October 13, 1925. Serial No. 62,227.

My invention relates to fish cleaning apparatus that is used in combination with the fish cleaning machines of standard make. An object of the invention is to provide a casing for the rotary scraper with air suction means whereby the fish are held against the scraper wheel during the cleaning process, and whereby all loose shreds and particles of the fish are sucked through the casing. Another object is to provide a scraper wheel with longitudinal teeth and transverse grooves for the reception of semi-annular fingers extending from the casing, with the teeth projecting exteriorly of the fingers so as to engage the fish that are to be cleaned. A further object is to provide means for adjusting the casing with respect to the scraper wheel so that the projection of the teeth may be varied as desired.

With the above and other objects in view which will appear as the description proceeds, the invention consists of the novel construction, adaptation, combination and arrangement of parts hereinafter described and claimed. These objects are accomplished by devices illustrated in the accompanying drawings, wherein:—

Fig. 2 is a view in rear end elevation of the apparatus mounted on the scraper wheel frame;

Fig. 3 is a view in transverse vertical section taken substantially on a broken line 3, 3 of Fig. 2;

Fig. 4 is a similar view taken on a broken line 4, 4 of Fig. 2;

Fig. 5 is a view in front end elevation; and

Fig. 6 is a view in longitudinal vertical section taken substantially on a broken line 6, 6 of Fig. 4.

Figure 1:
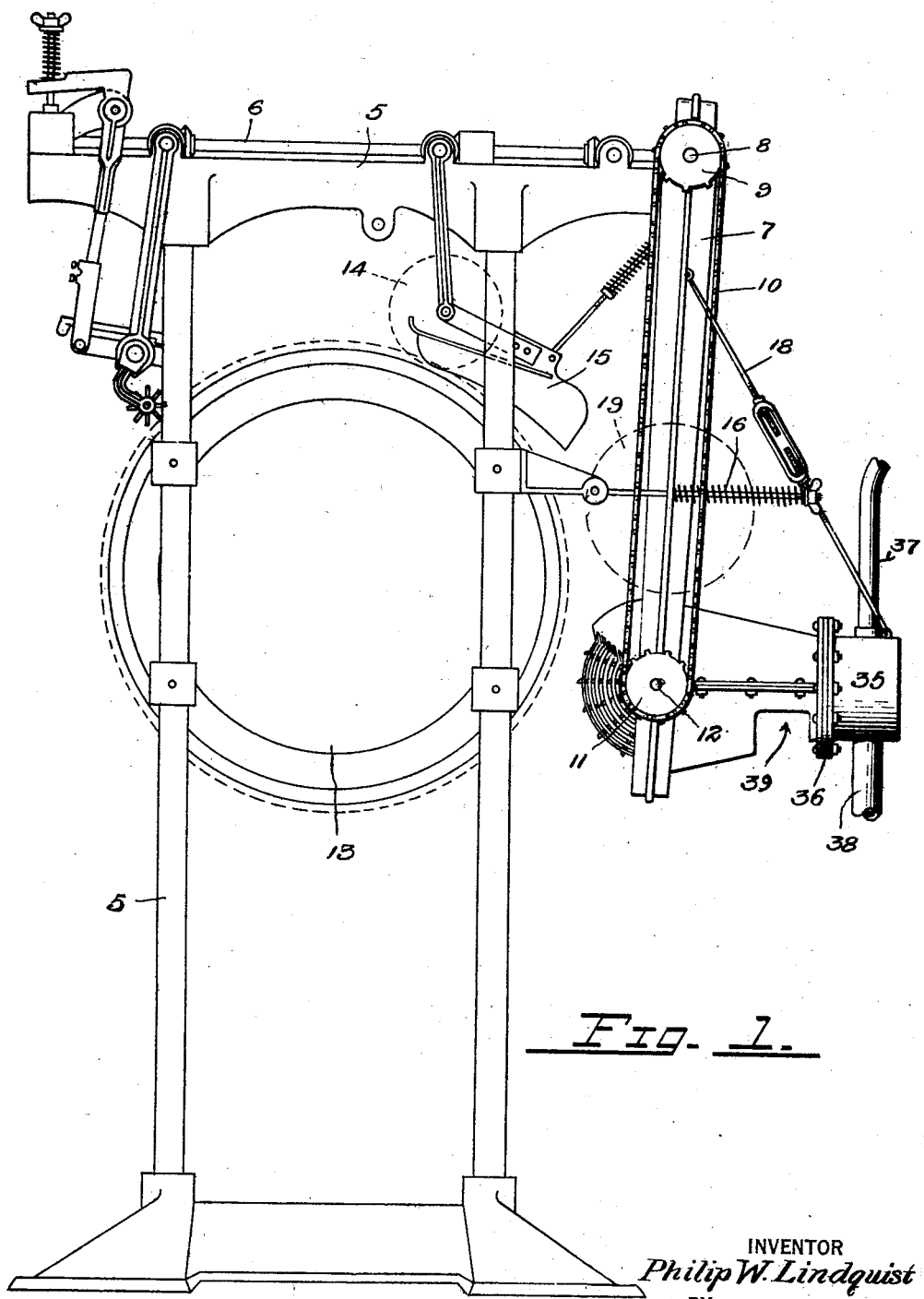
Figure 1 is an outline view in side elevation of a fish cleaning machine and showing my cleaning apparatus installed thereon.

Referring to the drawings, in which like reference numerals designate like parts, and more particularly to Fig. 1, the numeral 5 indicates the frame as a whole of a fish cleaning machine of standard make. It will be understood that only a sufficient part of the machine is shown to illustrate the combination of my apparatus therewith. Mounted on the top frame is a drive shaft 6 for supplying motion to the several operative parts as is well understood. A scraper frame 7 is pivotally supported by means of beveled gears on said shaft in the well known manner the details of which are not shown. My apparatus is mounted in the lower portion of said frame as clearly shown in the drawings. The transverse shaft 8, which is the center of pivotal support of said frame, is provded with a sprocket wheel 9 from which a chain 10 carries motion to a sprocket 11 that is keyed to the shaft 12 for supplying rotary motion to my apparatus as more fully hereinafter set forth. It will be expressly understood that I do not confine myself to this sprocket drive as I may prefer to use a shaft and beveled gear arrangement for supplying rotary motion.

Before describing my device in detail and referring to Fig. 1, it will be understood that the heads of the fish are removed and also the tails and fins are cut off as the fish are drawn around the bull wheel member 13. Upon coming in contact with the splitting saw 14, shown in dotted lines, their bellies are ripped and are partly opened by the opener 15. They are then carried around to engagement with the cleaning apparatus. A spring rod 16, secured to the frames 5 and 7, pivotally retains the apparatus in resilient engagement with the fish. The cleaning apparatus as a whole is pivotally suspended on the shaft 12 which is supported by bearings 17 on the frame 7. It will thus be seen that the operative end of the apparatus may be swingingly adjusted with respect to the bull wheel member 13, as by means of a turnbuckle rod 18 secured to the opposite or outer end of the apparatus end to the frame 7 or by any other suitable arrangement. As shown in dotted lines at 19 I sometimes use a second cleaning apparatus.

The scraper wheel 20 is keyed to the shaft 12 and is substantially in the shape of a double cone with concaved surfaces. It is provided with longitudinal teeth 21 and also with a plurality of grooves 22 that cut through the teeth 21 at right angles thereto. This arrangement in fact provides annular rows of projecting teeth around the scraper wheel as will be readily understood.

The casing in which the scraper wheel 20 is housed usually comprises an upper section 23 and a lower section 24 that are secured together by bolts 25 through their adjoining flanges as clearly shown in Fig. 3. The forward end of the lower section is cut away, as at 26, while the forward end of the upper section is provided with a plurality of fingers 27. These fingers are curved to conform to the scraper wheel and extend around same to a point slightly inside the lower casing section as shown in Fig. 4. Each one of them fits within one of the grooves 22 with sufficient space to prevent binding and the teeth 21 project slightly outside as shown in Figs. 3 and 4.

The arrangement for adjusting the fingers 27 with relation to the teeth 21 comprises square block bearings 28 interposed between each end of the scraper wheel 20 and its respective bearing 17. The shaft 12 turns freely within said block bearings. The lateral ends of the casing sections are made square, as at 29, to conform to the block bearings with a small space between as shown in Fig. 3. Set screws 30 extend through the casing on all four sides and engage the bearings 28. By loosening one of the screws and setting up on the opposite one it will be obvious that the casing may be shifted one way or the other to cause the teeth 21 to project exteriorly of the fingers more or less as desired. The bearings 28 are provided with flanges 31 that serve as closures for the ends of the casing and prevent the entry of too much air when the suction arrangement is in operation.

The suction means comprises a fan 32 mounted within the casing slightly back of the scraper wheel 20. Said fan is propelled by a wheel 33 and connected therewith by a shaft 34. A housing 35 encloses the wheel and a partition 36 separates said housing from the main casing of the device. The motive power for the wheel may be water or steam and enters by a flexible pipe 37 and discharges through a pipe 38 of much larger diameter. This means of supplying motive power for the suction device is merely intended for illustration and it will be understood that any suitable means may be used. An opening 39 is provided in the lower section 24 of the main casing for the escape of the air from the fan and also for entry in cleaning out the casing.

In the operation of my device the conical shape of the scraper wheel 20 will spread the fish open upon coming into engagement therewith. The sides of the fish being flexible the air suction will draw them snugly against the fingers 27 and the teeth 21 will remove the entrails and blood as will be readily understood. I sometimes use two of the devices; one being adjusted for removal of the entrails and the other for scraping out the blood.

The drawings are merely intended for the purpose of illustrating one means of reducing my principles to practice and such changes may be resorted to as are within the scope and spirit of the invention. While I have described the device with some particularity it will be understood that I intend no limitations except in so far as may be imposed by the appended claims.

Having thus described my invention, what I claim and desire to secure by Letters Patent is:—

1. The combination with a fish cleaning machine, of a fish cleaning apparatus comprising a rotary scraper wheel arranged to engage the fish on lines which are tangent to the said scraper wheel at its outer surface, a casing for said wheel, and air suction means for said casing.

2. The combination with a fish cleaning machine, of a fish cleaning apparatus comprising a rotary scraper wheel having a plurality of annular grooves, a casing with a plurality of fingers arranged to fit said grooves and air suction means for said casing.

3. The combination with a fish cleaning machine, of a fish cleaning apparatus comprising a rotary scraper wheel having a plurality of annular grooves, a casing with a plurality of fingers adapted to fit said grooves, means for adjusting said casing and fingers with respect to said grooves and suction means for the casing.

In witness whereof, I hereunto subscribe my name this 7th day of October, A. D. 1925.

PHILIP W. LINDQUIST.